INVENTOR
George Beverly Kinsey
AGENT

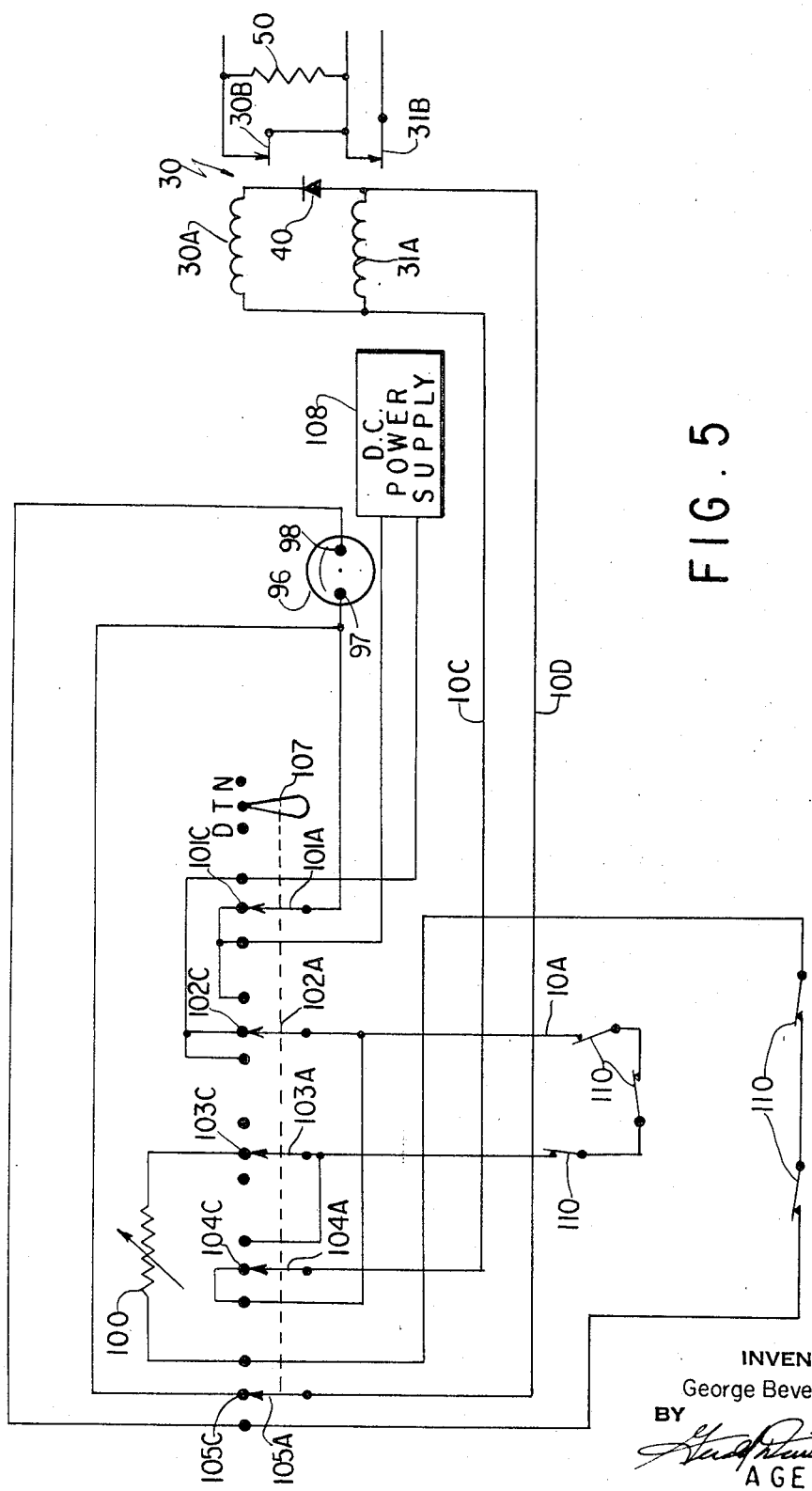

United States Patent Office 3,452,345
Patented June 24, 1969

3,452,345
ALARM MONITORING SYSTEM
George Beverly Kinsey, Roxboro, Quebec, Canada, assignor to Walter Kidde & Company of Canada, Ltd., Pointe Claire, Quebec, Canada
Filed July 15, 1966, Ser. No. 565,473
Int. Cl. G08b 1/08
U.S. Cl. 340—213
8 Claims The present invention relates to alarm monitoring systems and, more particularly, to such a system for monitoring alarm sending units from a remote point by use of telephone lines.

It is an object of the present invention to provide an improved alarm monitoring system for monitoring a plurality of alarm sending or control units over a minimum number of telephone lines.

Another object is to provide such a system wherein each alarm sending or control unit may be switched to an inactive condition during periods when monitoring of the protected premises is not desired.

Another object is to provide such a system wherein the monitoring equipment indicates whether the control units are in the active or inactive condition.

Another object is to provide such a system wherein the control units may be switched to a test condition which allows the operation of the alarm signal initiating elements to be tested without transmitting an alarm signal to the monitoring units.

Another object is to provide such a system wherein the monitoring units respond to an alarm signal by producing an indication which continues until the monitoring unit is switched to a reset position.

Another object is to provide such a system wherein an alarm indication continues after the monitoring unit is placed in the reset position so long as the alarm condition is present.

Another object is to provide such a system wherein the monitoring units respond to an alarm signal by producing a visual alarm which continues as long as the alarm condition exists and an audible alarm which terminates when the monitoring unit is placed in the reset position and is re-established when the visual alarm is terminated by the disappearance of the alarm condition.

A further object is to provide such a system which is simple, reliable, and inexpensive to produce.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustratiton and description, and is shown in the accompanying drawings, forming a part of the specification, wherein:

FIG. 5 is a wiring diagram similar to FIG. 3 showing the control unit in the test position.

Figure 1:
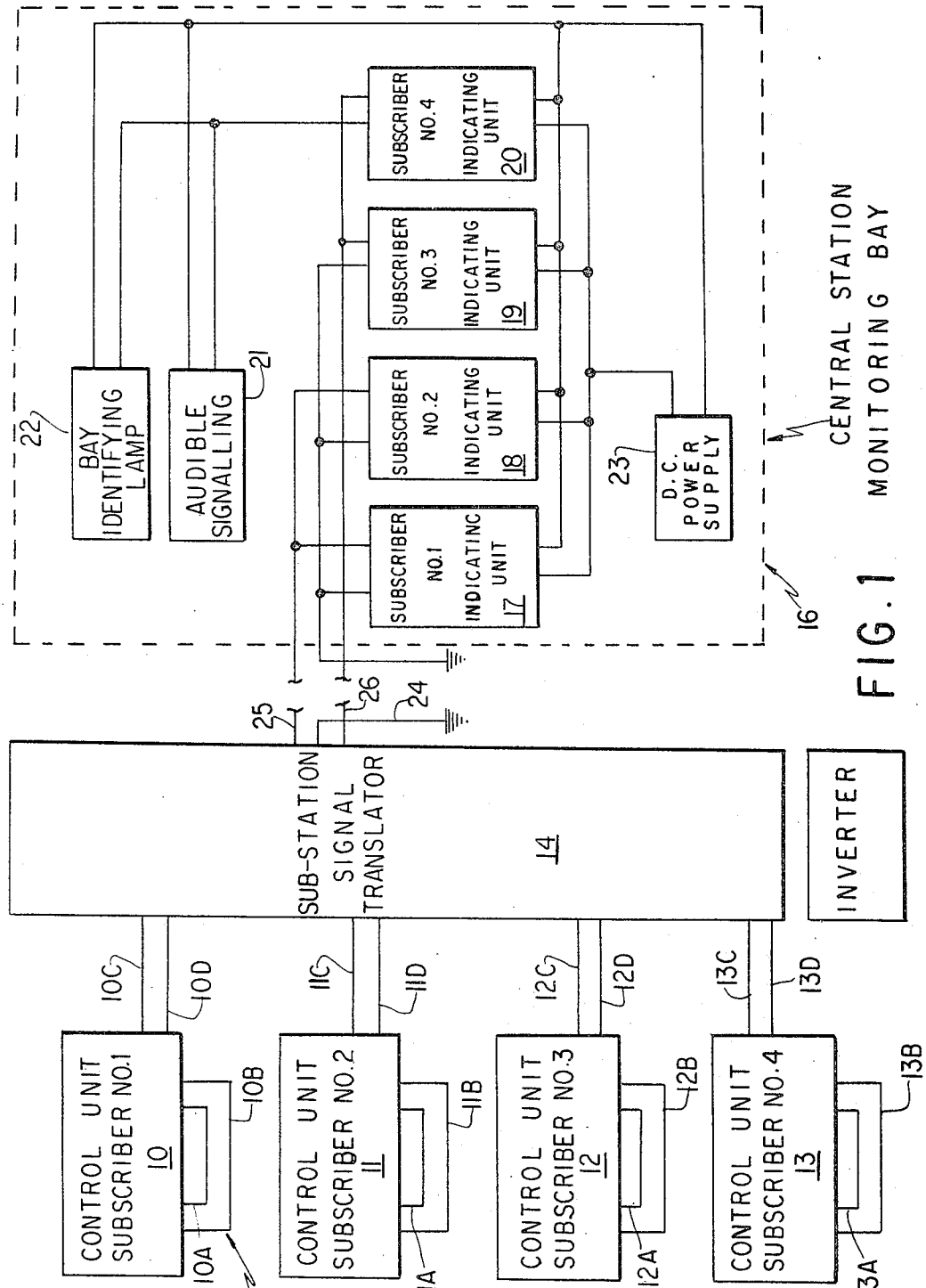
FIG. 1 is a schematic block diagram of a system in accordance with the present invention.

With reference to the drawings, and, particularly to FIG. 1 thereof, the system of the present invention generally comprises four sub-station control units 10 to 13; a sub-station signal translator 14; an inverter 15 associated with the translator 14; and a central station monitoring bay 16 including four indicating units 17 to 20; an audible signalling unit 21; a bay identifying lamp unit 22, and a D.C. power supply 23.

Each of the control units 10 to 13 is provided with a pair of normally closed protection circuits 10A and 10B to 13A and 13B respectively. The control units 10 to 13 are each connected to the signal translator 14 through a pair of wires 10C and 10D to 13C and 13D respectively, and the translator 14 is connected to the monitoring bay 16 through a ground connection 24 and a pair of telephone lines 25 and 26.

Figure 2:
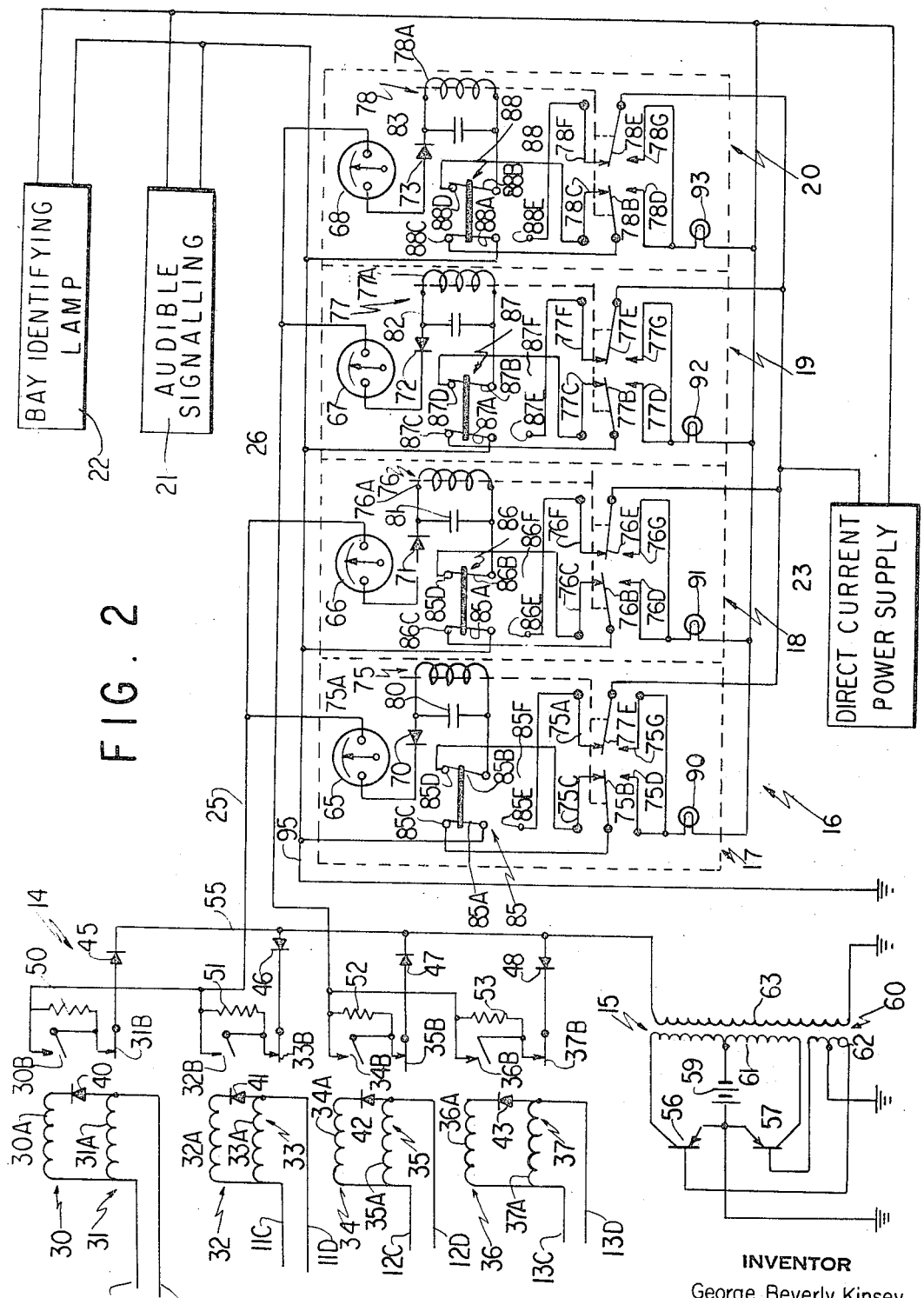
FIG. 2 is a wiring diagram of the sub-station signal translator, the inverter, and the central station monitoring equipment of FIG. 1.

Referring now to FIG. 2 in detail, the sub-station translator comprises eight relays 30 to 37 under the control of the sub-station control units, as described hereinafter, and having windings 30A to 37A respectively and switch contact pairs 30B to 37B respectively, four diodes 40 to 43 associated with the relay windings 30A to 37A, four diodes 45 to 48 associated with the relay contacts 30B to 37B, and four resistors 50 to 53.

The relay windings 30A, 32A, 34A, and 36A are respectively connected in series with the diodes 40 to 43 across the conductors 10C and 10D to 13C and 13D, and the relay windings 31A, 33A, 35A, and 37A are respectively connnected directly across the conductors 10C and 10D to 13C and 13D. The diodes 40 to 43 are respectively connected to allow current to flow from the conductors 10D to 13D through the relay windings 30A, 32A 34A, and 36A to the conductors 10C to 13C while preventing current flow in the reverse direction through these paths.

The relay contacts 30B to 37B are closed when the relay windings 30A to 37A are energized. The contacts 30B and 31B are connected in series with the diode 45 between the telephone line 25 and a conductor 55, and the contacts 32B and 33B are connected in series with the diode 46 between the line 25 and the conductor 55. The contacts 34B and 35B are likewise connected in series with the diode 47 between the telephone line 26 and the conductor 55, and the contacts 36B and 37B are connected in series with the diode 48 between the line 26 and the conductor 55. The diodes 45 and 47 are connected to allow current to flow from the lines 25 and 26 respectively through the associated contacts to the conductor 55, while the diodes 46 and 48 are connected to allow current to flow from the conductor 55 through the associated contacts to the lines 25 and 26 respectively. The resistors 50 to 53 are respectively connected in parallel with the relay contacts 30B, 32B, 34B, and 36B.

The inverter 15 includes two transistors 56 and 57, a battery 59, and a transformer 60 having a center tapped input winding 61, a center tapped feed-back winding 62 and an output winding 63. The base electrodes of the transistors 56 and 57 are connected to opposite ends of the feed-back winding 62, the collector electrodes thereof are connected to opposite ends of the input winding 61, and the emitter electrodes are both connected to ground. The battery 59 is connected between ground and the center tap of the winding 61, the center tap of the winding 62 is connected to ground, and the output winding 63 is connected between the conductor 55 and the grounded line 24.

Each of the indicating units 17–20 respectively include a meter 65–68, a diode 70–73, a relay 75–78, a capacitor 80–83, a double pole double throw toggle switch 85–88, and a lamp 90–93. Each of the relays 75–78 respectively have a winding 75A–78A, a first moveable contact 75B–78B, a first and second stationary contacts 75C–78C and 75D–78D associated with the first moveable contact, a second moveable contact 75E–78E, and a third and fourth stationary contacts 75F–78F and 75G–78G associated with the second moveable contact. The toggle switches 85–88 each respectively have a pair of moveable arm contacts 85A–88A and 85B–88B ganged together, a first pair of stationary contacts 85C–88C and 85D–88D, and a second pair of stationary contacts 85E–88E and 85F–88F.

In each of the indicating units 17–20, the meter 65–68, the diode 70–73, and the relay winding 75A–78A are connected in series between the moveable switch contacts 85B–88B and one of the telephone lines 25, 26. Each of the other moveable contacts 85A–88A is connected to a grounded conductor 95 and to the stationary switch contact 85F–88F respectively. The switch contacts 85C–88C are respectively connected to the moveable relay contacts 75B–78B, the switch contacts 85D–88D are respectively connected to the relay contacts 75C–78C, and the switch contacts 85E–88E are connected to the relay contacts 75F–78F respectively. The relay contacts 75D–78D are respectively connected to the relay contacts 75G–78G, and the lamps 90–93 are connected between the negative terminal of the D.C. source 23 and the relay contacts 75D–78D. The moveable relay contacts 75E–78E are each connected to the positive terminal of the D.C. source 23. The capacitors 80–83 are connected in parallel with the relay windings 75A–78A, respectively. The audible signalling unit 21 and the bay identifying lamp unit 22 are connected in parallel wtih each other between the grounded conductor 95 and the negative terminal of the source 23.

Figure 3:
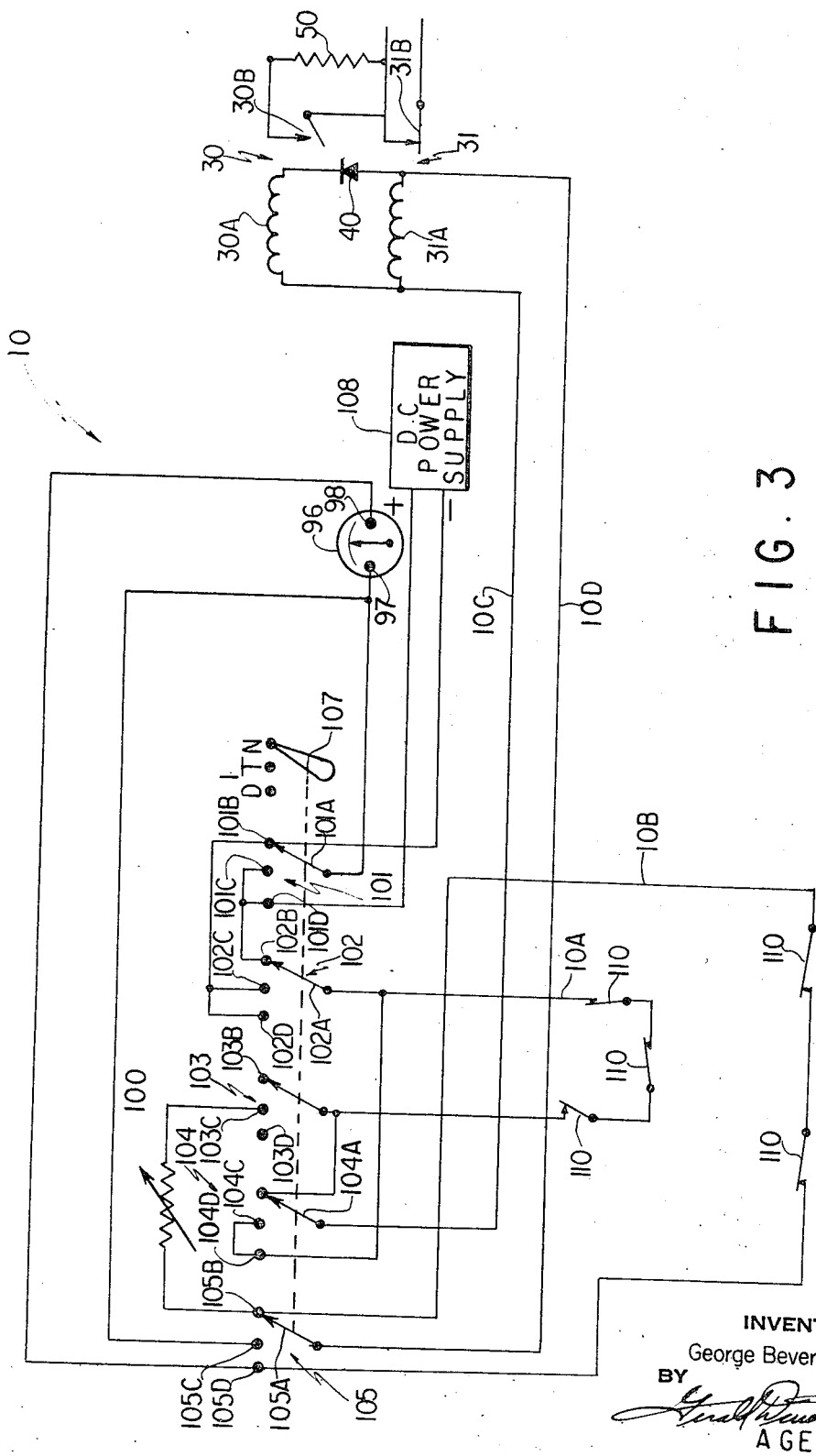
FIG. 3 is a wiring diagram of one of the control units of FIG. 1, shown in the night position, together with a portion of the substation signal translator.

Referring now to FIG. 3, there is shown in detail the sub-station control unit 10, which is identical to the control units 11 through 13. The control unit 10 includes a meter 96 having terminals 97 and 98, a variable resistor 100, five three position switches 101–105 which are ganged together and to a control handle 107, and a D.C. source 108. Each of the switches are respectively provided with a moveable contact 101A–105A, "night position" stationary contact 101B–105B, a "test position" stationary contact 101C–105C, and a "day position" stationary contact 101D–105D. The meter 96 is of the type which reads center scale when no current is flowing therethrough and deflects to either side depending upon the polarity of the current flowing therethrough.

The positive terminal of the D.C. source 108 is connected to the stationary switch contact 101D which is in turn connected to the stationary contacts 101C and 102B, and the negative terminal of the source 108 is connected to the stationary contact 101B which is in turn connected to the contacts 102C and 102D. The terminal 97 of the meter 96 is connected both to the moveable contact 101A and to the stationary contact 105C and the terminal 98 of the meter 96 is connected to the stationary contact 105D. The protection circuit 10A is connected between the moveable contacts 102A and 103A, the stationary contacts 104C and 104D being connected to the contact 102A, and the stationary contact 104B being connected to the contact 103A. The protection circuit 10B is connected between the stationary contacts 105D and 105B, and the resistor 100 is connected between the contact 105B and the contact 103C. Finally, the conductor 10C is connected to the moveable contact 104A, and the conductor 10D is connected to the moveable contact 105A.

The protection circuits 10A and 10B include a plurality of switch contact pairs 10 connected in series to provide normally closed circuit loops, the switch contact pairs 110 are incorporated into switches which are provided at the closures (i.e. windows, doors, etc.) of the enclosure to be protected against unauthorized entry. These switches are arranged so that the contacts are closed when the closures are closed and move into an open position when the closure is opened.

In operation, when it is desired to place the system in operation to protect an enclosure, the handle 107 is moved to the night position and the switches 101–105 assume the position shown in FIG. 3. Electrical current then flows from the positive terminal of the source 108 through the contacts 101D, 102B, 102A, through the protection circuit 10A, through the contacts 104B and 104A, through the conductor 10C and the relay winding 31A in the translator to the conductor 10D, through the contacts 105A and 105B, through the protection circuit 10B and the meter 96, and through the contacts 101A and 101B to the negative terminal of the source 108. Since the diode 40 prevents current from flowing through the winding 30A, only the relay 31 is energized and the contacts 31B are closed while the contacts 30B remain open so that the resistor 50 is connected in series with the contacts 31B. It will be seen that should any one of the switch contacts 110 be opened, the current path through the relay winding 31A would be interrupted and the contacts 31B would open.

When all of the control units 10–13 are set in the "night" position and none of the protection circuit loops are broken by the entry of an intruder, the relays 30–38 of the translator 14 are in the condition shown in FIG. 2.

The inverter 15 operates in the well-known manner to produce an alternating current, at a frequency of about 60 cycle across the conductor 55 and the grounded line 24. Each time the conductor 55 becomes positive, current flows from the conductor 55 to the grounded line 24 through the diode 48, the relay contacts 37B, the resistor 53, the line 26 (to the indicating unit 20), the meter 68, the diode 73, the relay winding 78A, the switch contacts 88B and 88D, the relay contacts 78C and 78B, the switch contacts 88C and 88A, the conductor 95 and the ground. At the same time, current also flows from the conductor 55 to the line 24 through the diode 46, the relay contacts 33B, the resistor 51, the line 25 (to the indicating unit 18), the meter 66, the diode 71, the relay winding 76A, the switch contacts 86B and 86D, the relay contacts 76C and 76B, the switch contacts 86C and 86A, the conductor 95, and the ground.

When the line 24 is positive and the conductor 55 is negative, current flows from the line 24 to the conductor 55 through the ground, the conductor 95 (to the indicating unit 17), the switch contacts 85A and 85C, the relay contacts 75B and 75C, the switch contacts 85D and 85B, the relay winding 75A, the diode 70, the meter 65, the conductor 25, the resistor 50, the relay contacts 31B, and the diode 45. At the same time, current flows also from the line 24 to the conductor 55 through the ground, the conductor 95 (to the indicating unit 19), the switch contacts 87A and 87C, the relay contacts 77B and 77C, the switch contacts 87D and 87B, the relay winding 77A, the diode 72, the meter 67, the line 26, the resistor 52, the relay contacts 35B, and the diode 47.

It will be seen, therefore, that when the control units are in the "night" position and no alarm condition exists, current flows through each of the meters 65–68 and through each of the relay windings 75A–78A. This current flow causes a half scale deflection of the meters and maintains the relays 75–78 in their energized position which is shown in FIG. 2.

Should an intruder enter the premises protected by the control unit 10 and in so doing cause one of the switch contacts 110 to open, the current flow through the meter 96 and the relay winding 31A, would be interrupted. The meter 96 then reads center scale and the relay contacts 31B open. It will be seen that the current flow through the meter 65 and the relay winding 75A would be interrupted. The relay 75 is thus de-energized allowing the moveable contacts 75B and 75E thereof to move into contact with the contacts 75D and 75G respectively.

Current then flows from the positive terminal of the D.C. source 23 through the relay contacts 75E and 75G and then divides, one flow path being through the lamp 90 back to the negative terminal of the source 23, and the other flow path being through the relay contacts 75D and 75B, the switch contacts 85C and 85A, the conductor 95, and the alarm units 21 and 22, back to the negative terminal of the source 23. The bay identifying lamp unit 22, the audible signalling unit 21, and the lamp 90 are energized to apprise the attendant that an alarm condition exists at the location protected by control unit 10.

Once the indicating unit 17 is placed in the alarm condition, it remains in that condition until it is reset (even if the protection circuit 10A or 10B is restored to its conductive condition) because the current path through the relay winding 75A has been interrupted by the movement of the relay contact 75B away from the contact 75C.

To reset the unit 17, the toggle switch 85 is thrown to move the arm 85A into contact with the contact 85E and the arm 85B into contact with the contact 85F. A current path from the conductor 95 to the line 25 is thus established through the relay winding 75A by virtue of the fact that the switch arm 85B is in contact with the contact 85F which is permanently connected to the conductor 95. When the switch 85 is thrown, the current path from the source 23 to the indicating units 21 and 22 is interrupted by virtue of the separation of the switch arm 85A from the contact 85C. If the alarm condition still exists, the relay contacts 31B are still open and no current will flow through the relay winding 75A and the alarm units 21 and 22 are de-energized; however, the lamp 90 remains lighted to indicate the presence of the alarm condition. When the alarm condition is terminated, the relay contacts 31B close and current flows through the relay winding 75A causing the contact arms 75B and 75E to move into their upper position as shown in FIG. 2. The current flow to the alarm units 21 and 22 is thus re-established through the relay contacts 75E and 75F and the switch contacts 85E and 85A. The alarm units 21 and 22 are thus re-energized and the lamp 90 is extinguished to indicate the alarm condition has ceased. The resetting of the indicating unit is then contemplated by returning the toggle switch 85 to its original position. During the period of time required for the switch arms 85A and 85B to change their position, the condenser 80 discharges through the relay winding 75A to insure that the relay 75 is not de-energized by the momentary interruption of the circuit during the operation of the switch.

In like manner, should any of the protection circuits 11A–13A or 11B–13B be interupted, the relay 33, 35, or 37 connected thereto would be de-energized and the associated indicating circuit 18, 19, or 20 would operate to indicate the presence of the alarm condition.

Figure 4:
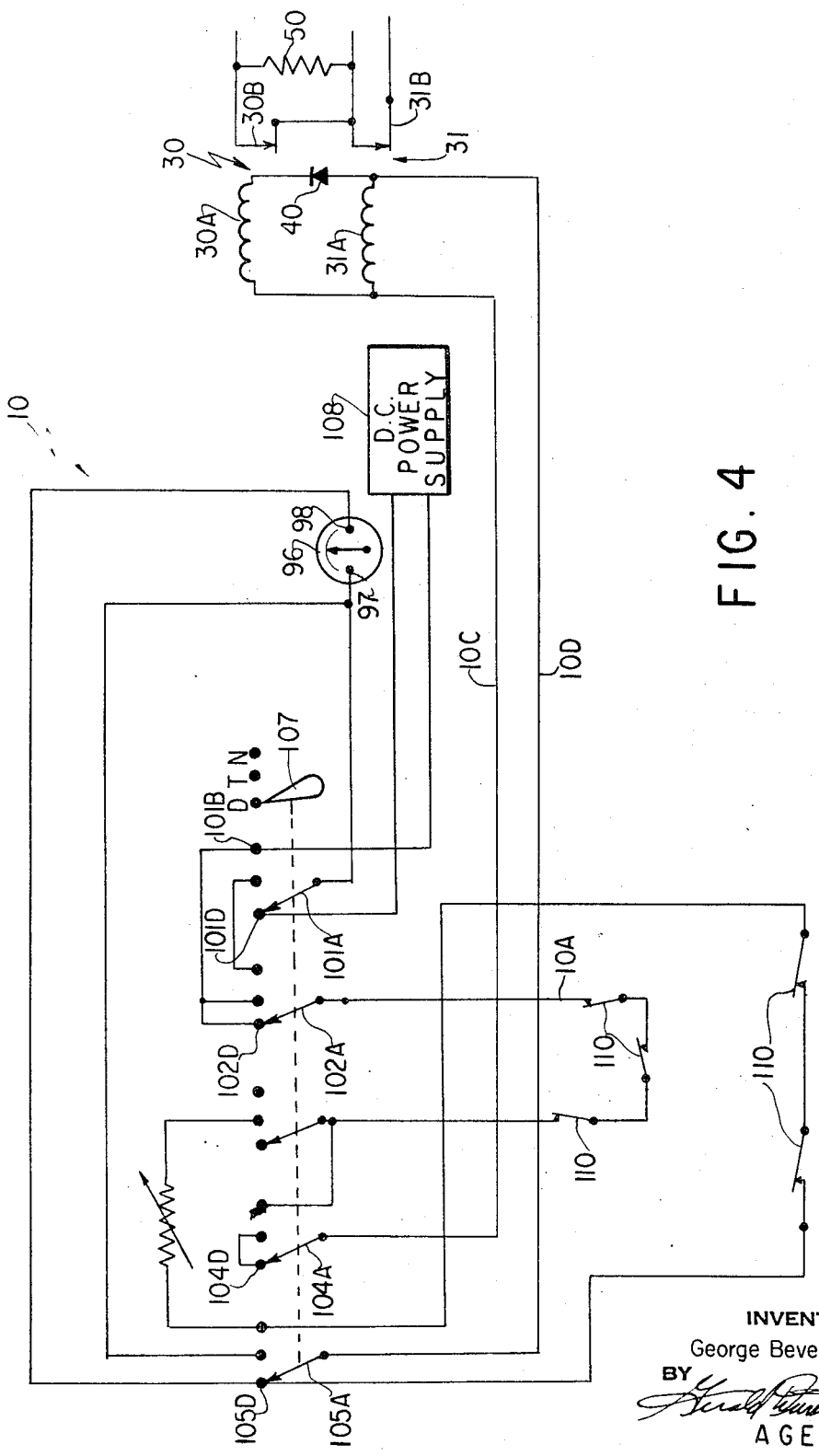
FIG. 4 is a wiring diagram similar to FIG. 3 showing the control unit in the day position.

During the daytime and other periods when persons are using the protected premises, the control units are switched to the "day" positions as shown in FIG. 4, so that the opening of a door or window will not cause an alarm.

In this position, current flows from the positive terminal of the D.C. source 108 through the switch contacts 101D and 101A, the meter 96, the contacts 105D and 105A, the conductor 10D, the relay winding 30A (through the diode 40), the conductor 10C, the contacts 104A and 104D, and the contacts 102A and 102D to the negative terminal of the source 108.

It will be seen that in this condition both of the relays 30 and 31 are energized by a current flow which does not pass through the protection circuits 10A and 10B. Therefore, both of the relay contact pairs 30B and 31B remain closed regardless of the position of the switches 110. With both of the contacts 30B and 31B closed, the resistor 50 is removed from the circuit with the result that a heavier current flows to the indicating unit 17 and the meter 65 deflects full scale. Thus personnel at the central station can tell which sub-stations are in the "day" condition merely by inspecting the meters in the indicating units.

It will also be noted that the meter 96 in the control unit 10 is deflected in a direction opposite to that which is experienced when the unit is in the "night" position.

In switching the control units between the "Day" and "Night" position, the unit passes through a test position wherein the continuity of the protection circuits and the operation of the switches 110 can be tested without causing an alarm at the central station.

With the control unit 10 in the test position, as shown in FIG. 5, current flows from the positive terminal of the power supply 108 through the contacts 101C and 101A and then splits: one portion flowing through the contacts 105C and 105A, the conductor 10D, the relay windings 31A and 30A, the conductor 10C, the contacts 104A and 104C, and the contacts 102A and 102C back to the source 108; the other portion flowing through the meter 96, the protection circuit 10B, the resistor 100, the contacts 103C and 103A, the protection circuit 10A, and the contacts 102A and 102C back to the source 108.

It will be seen that the first branch circuit described above maintains the relays 30 and 31 energized so that no alarm is transmitted to the central station while the second branch circuit allows the continuity of the protection circuits to be tested by means of the meter 96. If both of the protection circuits are continuous, the meter will deflect to the right as shown. However, if either of the protection circuits are interrupted at any point, the meter will return to the center scale. The operation of the switches 110 can easily be tested by opening the associated door or window and checking the meter to see if it returns to center scale as would be the case if the switch operates properly.

From the foregoing description, it will be seen that the present invention provides an improved alarm monitoring system for monitoring a plurality of alarm sending or control units over a minimum number of telephone lines wherein the control units have an active and an inactive condition, the monitoring equipment indicates the condition of the control units, the alarm signalling elements can be tested without producing an alarm signal, and the monitoring equipment produces a visual alarm which continues as long as the alarm condition exists and produces an audible alarm which can be terminated by operation of a reset switch and which is then re-established when the visual alarm is terminated.

I claim:

1. In an alarm monitoring system, the combination of two normally closed protection circuits each including at least one normally closed alarm switch; first and second control units each connected to a different one of said protection circuits and each having a protecting condition for producing an output current of a first polarity when the protection circuit connected thereto is closed and having a standby condition for producing an output current of a second polarity independent of the condition of the protection circuit; first and second indicating units remote from said control units each for giving an indication when a different one of said protection circuits is interrupted by the opening of an alarm switch therein; a signal translator adjacent said control units for receiving the output of said control units and for operating the indicating units; first and second conductvie means for providing first and second paths for electrical current between said translator and each of said indicating units, said translator including means for transmitting over said conductive means spaced electrical pulses of a first polarity and having a first magnitude when said first control unit is producing a protecting condition output, means for transmitting over said conductive means spaced electrical pulses of a second polarity having said first magnitude when said second control unit is producing a protecting condition output, means for changing the magnitude of said pulses of said first polarity when said first control unit is placed in the standby condition, and means for changing the magnitude of said pulses of said second polarity when said second control unit is placed in a standby condition, said first indicating means including means for giving an indication of the magnitude of said first polarity pulses and means for actuating an alarm when said first polarity pulses are terminated by the operation of an alarm switch in the protection circuit connected to said first control unit, and said second indicating means including means for giving an indication of the magnitude of said second polarity pulses and means for actuating an alarm when said second polarity pulses are terminated by the operation of an alarmswitch in the protection circuit connected to said second control unit.

2. Apparatus according to claim 1, wherein said signal translator includes a source of alternating current power having a first terminal connected to said first conductive means and having a second terminal, a first relay including a first winding connected to said first control unit and including a first pair of contacts, a second relay including a second winding connected to said second control unit and including a second pair of contacts, a first resistor and a first diode connected in series with said first pair of contacts between said second conductive means and said second terminal, a second resistor and a second diode connected in series with said second pair of contacts between said second conductive means and said second terminal, said first diode being connected to transmit only positive pulses to said conductive means and said second diode being connected to transmit only negative pulses to said conductive means, third and fourth diodes, a third relay including a third winding connected in series with said third diode across said first winding and having a third pair of contacts connected across said first resistor, a fourth relay including a fourth winding connected in series with said fourth diode across said second winding and having a fourth pair of contacts connected across said second resistor, said third and fourth relays being connected to prevent first polarity output currents of said indicating units from passing through said third and fourth windings.

3. Apparatus according to claim 2, wherein said indicating units each include a series circuit comprising a meter, a diode, and electrically operable alarm actuating means connected between said first and second conductive means, said diode in said first indicating unit being connected to allow only positive pulses to pass and said diode in said second indicating unit being connected to allow only negative pulses to pass.

4. Apparatus according to claim 3 wherein said indicating units each include a relay winding, relay contact means under the control of said winding having a normal position when said winding is energized and having an operated position when said winding is de-energized, normally open alarm circuit means, a source of power for said alarm circuit means, and manually operable switch means having normal and operated positions, said relay winding being connected in series with said diode and said meter, said contact means being connected to complete said series circuit when said winding is energized and to open said series circuit and connect said alarm circuit means across said power source when said winding is de-energized in response to an alarm condition, said switch means including a first contact set connected to re-close said series circuit and re-energize said relay winding when said switch means is placed in its operated position after an alarm condition has occurred.

5. Apparatus according to claim 4, wherein said switch means includes a second contact set, and said alarm circuit means includes a visual alarm and an audible alarm, said visual alarm being connected through said relay contact means to said power source to be energized when said winding is de-energized, said audible alarm being connected to said source through said second set and said relay contact means to be energized when said winding is de-energized while said switch means is in its normal position and when said switch means is in its operated position while said winding is energized.

6. Apparatus according to claim 1, wherein each of said control units include a pair of output conductors, a source of direct current power, a meter, and switching means, said switching means having a first position for connecting said source and said meter in series with one of said protection circuits across said output conductors in a manner so that the current flow through said meter and said output conductors is in a first direction, and said switching means having a second position for connecting only said source and said meter in series across said output conductors in a manner such that the current flow through said meter and said output conductors is in a second direction.

7. Apparatus according to claim 6, wherein said switching means has a third position wherein said meter and said protection circuit are connected in series across said output conductors and said source is connected across said output conductors to provide independent electrical currents through said meter and said output conductors so that the protection circuit alarm switches can be tested by use of the meter without disturbing the current flow to the output conductors.

8. Apparaus according to claim 7, wherein said switching means connects said source across said output conductors so that the current flows through said output conductors is in said second direction.

References Cited

UNITED STATES PATENTS

| | | | |
|---|---|---|---|
| 3,135,951 | 6/1964 | Byrne | 340—409 X |
| 3,138,792 | 6/1964 | Jenkins et al. | 340—276 X |
| 3,233,232 | 2/1966 | Brennon | 179—5 X |
| 3,307,176 | 2/1967 | Sadler | 340—276 X |

JOHN W. CALDWELL, Primary Examiner.

D. L. TRAFTON, Assistant Examiner.

U.S. Cl. X.R.

179—5; 340—276, 256